United States Patent
Shaw et al.

(10) Patent No.: US 10,009,056 B1
(45) Date of Patent: Jun. 26, 2018

(54) SYSTEM AND METHOD FOR MANAGING VOLTAGE SUPPLIED TO TRANSMITTER ENCLOSED WITHIN FULLY METALLIC CHASSIS INCORPORATING PROXIMITY SENSING ELEMENT

(71) Applicant: Dell Products, LP, Round Rock, TX (US)

(72) Inventors: Timothy Shaw, Austin, TX (US); Ching Wei Chang, Austin, TX (US); Mark Menendez, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days. days.

(21) Appl. No.: 15/499,771

(22) Filed: Apr. 27, 2017

(51) Int. Cl.
*H04B 1/38* (2015.01)
*H04B 1/3827* (2015.01)
*H04M 1/725* (2006.01)

(52) U.S. Cl.
CPC .......... *H04B 1/3838* (2013.01); *H04M 1/725* (2013.01); *H04M 2250/12* (2013.01)

(58) Field of Classification Search
CPC .. H04B 1/3838; H04M 1/725; H04M 2250/12
USPC .......................................................... 455/73
See application file for complete search history.

(56) References Cited

U.S. PATENT DOCUMENTS

| | | | |
|---|---|---|---|
| 4,345,167 A | 8/1982 | Calvin | |
| 5,565,658 A | 10/1996 | Gerpheide | |
| 6,223,877 B1 * | 5/2001 | McGinty | G07D 3/121 194/317 |
| 7,146,139 B2 | 12/2006 | Nevermann | |
| 7,834,853 B2 * | 11/2010 | Finney | H04M 1/23 200/5 A |
| 7,991,147 B2 * | 8/2011 | Emmert | H04M 1/026 379/433.01 |
| 9,002,262 B1 * | 4/2015 | Kuo | H01Q 1/50 343/702 |
| 2005/0197158 A1 * | 9/2005 | Silverbrook | B41J 3/445 455/556.2 |
| 2005/0263765 A1 | 12/2005 | Maekawa | |
| 2008/0019502 A1 * | 1/2008 | Emmert | H04M 1/026 379/433.07 |
| 2008/0037765 A1 * | 2/2008 | Finney | H04M 1/23 379/368 |

(Continued)

*Primary Examiner* — April G Gonzales
(74) *Attorney, Agent, or Firm* — Prol Intellectual Property Law, PLLC; H. Kenneth Prol

(57) ABSTRACT

An information handling system operating a proximity based transmitting antenna power management system comprising a processor executing machine readable executable code instructions of the proximity based transmitting antenna power management system, an integrated circuit operatively connected to a first embedded proximity sensing element, a first transmitting antenna, and the processor, the first transmitting antenna mounted upon a metal chassis enclosing the processor, and the integrated circuit, the first embedded proximity sensing element having the same material composition as the metal chassis co-located with the first transmitting antenna and lying flush with the external surface of the metal chassis in a corner of the external surface of the metal chassis, and an insulating element disposed between the metal chassis and the first embedded proximity sensing element via injection molding.

20 Claims, 14 Drawing Sheets

(56) References Cited

U.S. PATENT DOCUMENTS

| | | | |
|---|---|---|---|
| 2008/0037770 A1* | 2/2008 | Emmert | H04M 1/026 379/433.01 |
| 2008/0037771 A1* | 2/2008 | Black | H04M 1/0266 379/433.01 |
| 2010/0142202 A1 | 6/2010 | Sugishita | |
| 2010/0149582 A1* | 6/2010 | Silverbrook | B41J 3/445 358/1.14 |
| 2012/0071195 A1 | 3/2012 | Chakraborty | |
| 2015/0207231 A1* | 7/2015 | Oh | H01Q 7/00 455/73 |
| 2015/0288410 A1* | 10/2015 | Adiletta | H04B 1/40 455/73 |

* cited by examiner

SYSTEM AND METHOD FOR MANAGING VOLTAGE SUPPLIED TO TRANSMITTER ENCLOSED WITHIN FULLY METALLIC CHASSIS INCORPORATING PROXIMITY SENSING ELEMENT

FIELD OF THE DISCLOSURE

The present disclosure generally relates to information handling systems, and more particularly relates to an apparatus including a metal chassis incorporating a proximity sensor and a radio-frequency transmitter, and to a system and method of managing voltage supplied to the transmitter based upon proximity of a human body part as detected by the proximity sensor.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. The information handling system may also include telecommunication, network communication, and video communication capabilities. The information handling system may also include one or more buses operable to transmit communications between the various hardware components. The information handling system may also include telecommunication, network communication, and video communication capabilities. Further, the information handling system may require limitations on antenna power levels for wireless communications due to specific absorption limits when humans are proximate to those antennas during transmission.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
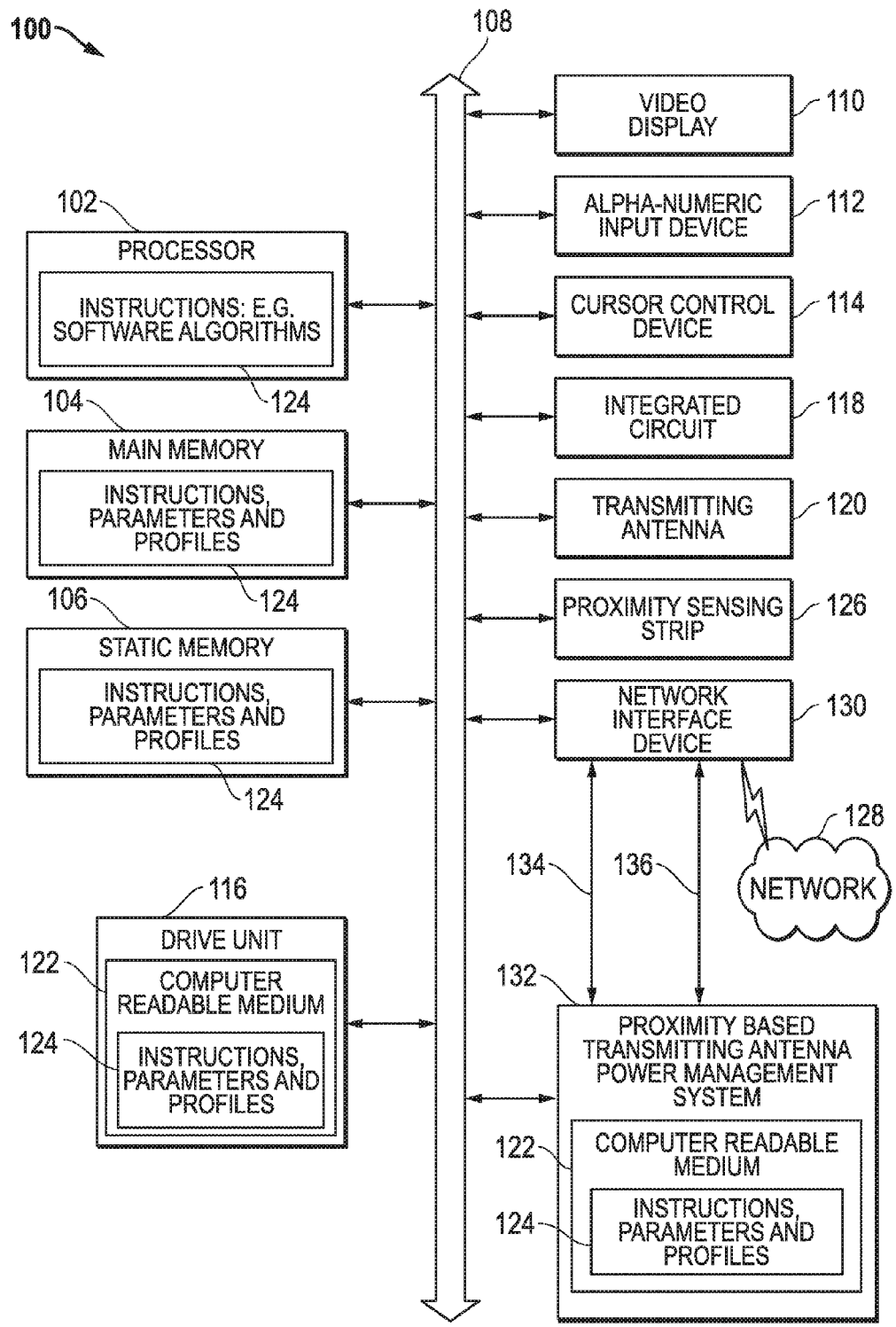
FIG. 1 illustrates a generalized embodiment of information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

The Federal Communications Commission (FCC) regulates the strength of radio frequency signals an LTE antenna within a commercial product sold in the United States may emit. Higher strength radio frequency signals may result in stronger signals and better communication, but may also increase the specific absorption rate (SAR), or rate at which energy is absorbed by the human body. The FCC requires LTE antennas within US commercial products to lower the power supplied to the LTE antenna when the antenna is in close proximity to a human body part in order to avoid any increase in SAR. In order to comply with these requirements, many LTE-compatible devices include proximity sensors that may detect nearby human body parts.

Proximity sensors may sense nearby human body parts by detecting a change in an electro-magnetic field generated by the sensor. A proximity sensor may receive a small voltage in order to emit a low-level electromagnetic field. When a human body part comes into close proximity with the proximity sensor, the presence of the body part may change the local electric field, which may also alter the mutual capacitance across the proximity sensor. The proximity sensor may register the capacitance change at one or more locations across its surface in order to determine the position of the human body part with reference to the dimensions of the proximity sensor.

Many LTE-enabled devices integrate one or more LTE antennas and one or more proximity sensors within a metallic chassis that encloses an information handling system. However, proximity sensors, which emit a low-level electromagnetic field, as discussed above, cannot project an adequate field strength through the metallic material of the chassis in order to detect a human body part. Many information handling systems overcome this problem by machining a gap in the chassis under which the proximity sensor will be located, and bonding a radio-frequency transparent window within the gap in the chassis after the chassis has been created. Such a window may allow a radio frequency of adequate field strength to pass through in order to detect a nearby human body part. The window may also be painted over in order to attempt to match the color of the surrounding metallic chassis, or may be left unpainted. Finally, the proximity sensor may be integrated within the information handling system directly underneath the radio-frequency transparent window. This solution creates multiple process steps and uses several parts that would be unnecessary if the proximity sensor could be formed from the chassis material and integrated into the chassis, without the need for a secondarily bonded radio frequency transparent window. A process that does not require these extraneous steps and parts is needed.

Such a process may remove extraneous parts by determining the location of the proximity sensor, etching a gap in the chassis surrounding the location of the proximity sensor such that a portion of the chassis is completely separated from the remaining chassis. This step is analogous to the creation of a gap for the proximity sensor in the chassis described above, except that the processes described above would next remove a portion of the chassis and later replace it with the radio frequency transparent window. In contrast, embodiments of the present disclosure do not discard this isolated portion of the metallic chassis, but rather, adapt that isolated portion for use as the proximity sensor itself. Embodiments of this disclosure further bond the proximity sensor in place within the metallic chassis, and flush with the exterior of the metallic chassis by injecting an insulating material into the gap between the chassis and the proximity sensor. Such a process may remove extraneous process steps of removing the isolated portion of the chassis, bonding the window in its place, and adding the proximity sensor below the chassis. In effect, instead of forming the chassis with a window, then integrating the proximity sensor beneath the window, the process of the present disclosure makes a chassis with a proximity sensor incorporated within it, rather than beneath it. The process of the present disclosure further results in a single chassis of uniform metallic material, including the proximity sensor, removing any need to paint the chassis after machining and integration.

The proximity sensor of embodiments described herein may be co-located nearby a transmitting antenna. The transmitting antenna, proximity sensor, and processor of an information handling system located inside the chassis may be operatively connected to an integrated circuit, also located within the interior of the metallic chassis. Further, the information handling system may include a proximity based transmitting antenna power management system that directs the operation of a proximity sensing strip lying flush with the exterior surface of, and composed of the same material as the metal chassis encasing the information handling system. The processor may execute machine-readable code instructions of a proximity based transmitting antenna power management system to instruct the integrated circuit to provide a low-level voltage to the proximity sensor, detect a change in the capacitance field generated by the proximity sensor when a human body part approaches the sensor, and to instruct the integrated circuit to decrease the power supply to the nearby transmitting antenna, in order to comply with FCC regulations.

In other embodiments of the present disclosure, the proximity sensor may comprise two capacitive elements such as capacitive strips, oriented disparately to one another. For example, one strip may lie flush with one of the six sides of the metal chassis, and another strip may lie flush with another of the six sides of the metal chassis. In such embodiments, one of the capacitive elements such as the example capacitive strips could lie flush with the top exterior of the metallic chassis while the other capacitive element could lie flush with the side exterior of the metallic chassis. Each capacitive element may generate a separate capacitive field emitted perpendicularly from its surface. In such a way, the proximity sensor may detect a human object approaching the chassis from either the top or the side of the chassis. In further embodiments, the proximity sensor may also detect a human object approaching the information handling system enclosed within the chassis from the screen side of the open information handling system by generating a separate capacitive field emitted perpendicularly from its bottom surface through the radio-frequency transparent (or partially transparent) screen.

In other embodiments of the present disclosure, the metallic chassis may include multiple proximity sensors, each located nearby an individual transmitting antenna. In such an embodiment, the processor may execute machine-readable executable code instructions of the proximity based transmitting antenna power management system to detect the presence of a human body part nearby one antenna, but not nearby a second antenna, and to consequently instruct the integrated circuit to decrease the power supplied to only the first antenna. In such a way, the proximity based transmitting antenna power management system may more effectively comply with FCC regulations without compromising received LTE signal strength unnecessarily.

Examples are set forth below with respect to particular aspects of an information handling system for limiting battery charging of information handling systems during storage and shipping states.

FIG. 1 illustrates an information handling system 100 similar to information handling systems according to several aspects of the present disclosure. For example, an information handling system 100 may be any mobile or other information handling system capable of executing a set of instructions (sequential or otherwise) that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets, of instructions to perform one or more computer functions.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of the proximity based transmitting antenna power management system 132, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices. Portions of an information handling system may themselves be considered information handling systems.

As shown, the information handling system 100 may further include a video display 110. The video display 110 in an embodiment may function as a liquid crystal display (LCD), an organic light emitting diode (OLED), a flat panel display, a solid state display, or a cathode ray tube (CRT). Additionally, the information handling system 100 may include an alpha numeric input device 112, such as a keyboard, and a cursor control device 114, such as a mouse, touchpad, or gesture or touch screen input.

Network interface device 130 represents a NIC disposed within information handling system 100, on a main circuit board of the information handling system, integrated onto another component such as processor 102, in another suitable location, or a combination thereof. The network interface device 130 can include another information handling system, a data storage system, another network, a grid management system, another suitable resource, or a combination thereof. Network interface device 130 in an embodiment may operably connect to a network 128. Connection to network 128 may be wired or wireless.

The information handling system 100 can represent a server device whose resources can be shared by multiple client devices, or it can represent an individual client device, such as a desktop personal computer, a laptop computer, a tablet computer, or a mobile phone. In a networked deployment, the information handling system 100 may operate in the capacity of a server or as a client user computer in a server-client user network environment, or as a peer computer system in a peer-to-peer (or distributed) network environment.

The information handling system 100 can include a set of code instructions 124 that can be executed to cause the computer system to perform any one or more of the methods or computer based functions disclosed herein. For example, information handling system 100 includes one or more application programs 124, and Basic Input/Output System and Firmware (BIOS/FW) code instructions 124. BIOS/FW code instructions 124 function to initialize information handling system 100 on power up, to launch an operating system, and to manage input and output interactions between the operating system and the other elements of information handling system 100. In a particular embodiment, BIOS/FW code instructions 124 reside in main memory 104, and include machine-executable code that is executed by processor 102 to perform various functions of information handling system 100. In another embodiment, application programs and BIOS/FW code reside in another storage medium of information handling system 100. For example, application programs and BIOS/FW code can reside in static memory 106, drive unit 116, in a ROM (not illustrated) associated with information handling system 100 or other memory. Other options include application programs and BIOS/FW code sourced from remote locations, for example via a hypervisor or other system, that may be associated with various devices of information handling system 100 partially in main memory 104, static memory 106, drive unit 116 or in a storage system (not illustrated) associated with network interface device 130 or any combination thereof. Application programs 124, and BIOS/FW code instructions 124 can each be implemented as single programs, or as separate programs carrying out the various features as described herein. Application program interfaces (APIs) such as Win 32 API may enable application programs 124 to interact or integrate operations with one another.

In an example of the present disclosure, the processor 102 may execute code instructions 124 of the proximity based transmitting antenna power management system 132 as disclosed herein, and an API may enable interaction between the application program and device drivers and other aspects of the information handling system and a proximity based transmitting antenna power management system 132 thereon. The computer system 100 may operate as a standalone device or may be connected, such as via a network, to other computer systems or peripheral devices.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The proximity based transmitting antenna power management system 132 and the drive unit 116 may include a computer-readable medium 122 such as a magnetic disk in an example embodiment. The computer-readable medium of the main memory 104, static memory 106, drive unit 116, and proximity based transmitting antenna power management system 132 may store one or more sets of code instructions 124, such as software code corresponding to the present disclosure. In a particular non-limiting, exemplary embodiment, the proximity based transmitting antenna power management system 132 may comprise firmware code instructions operating upon the integrated circuit 118. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The proximity based transmitting antenna power management system 132 computer readable medium 122 may also contain space for data storage. The information handling system 100 may also include a proximity based transmitting antenna power management system 132 that may be operably connected to the bus 108. The proximity based transmitting antenna power management system 132 may perform tasks related to regulating the power or voltage supplied to the transmitting antenna 120 and/or the proximity sensing element such as proximity sensing strip 126 via the integrated circuit 118. In an embodiment, the proximity based transmitting antenna power management system 132 may communicate with the main memory 104, the processor 102, the video display 110, the alpha-numeric input device 112, the integrated circuit 118, and the network interface device 130 via bus 108, and several forms of communication may be used, including ACPI, SMBus, or shared memory.

The transmitting antenna 120 in an embodiment may comprise an antenna capable of transmitting radio frequency communications. It is contemplated the transmitting antenna 120 may be capable of transmitting radio frequency communications in any specified band, including, but not limited to frequencies associated with the LTE standard, the Wi-GIG standard, and any other forthcoming standards, as defined by the FCC. In other embodiments, the transmitting antenna 120 may be capable of transmitting radio frequency communications within only a limited subset of the LTE (or other standard) band space, such as for example, low band LTE, or high band LTE, as described in greater detail below. In still other embodiments, the transmitting antenna 120 may be capable of both transmitting and receiving radio frequency communications, thus operating as a transceiving antenna. More than one transmitting antenna 120 may be present in the embodiments of the present disclosure, as described in greater detail below.

The proximity sensing element such as proximity sensing strip 126 in an embodiment may be comprised of the same material as a metallic chassis enclosing the processor and integrated circuit, including one or more capacitive element such as the capacitive strips described in greater detail below. The proximity sensing element 126, in an embodiment, may sense nearby human body parts by detecting a change in an electro-magnetic field generated by the sensor. The proximity sensing element 126 in an embodiment may receive a small voltage from the integrated circuit 118 in order to emit the low-level electromagnetic field. When a human body part comes into close proximity with the proximity sensing element 126, the presence of the body part may change the local electric field of the proximity sensing element 126, which may also alter the mutual capacitance across the proximity sensor 126 capacitive strips.

The proximity sensing strip 126 in an embodiment may lie flush with the exterior surface of the metal chassis, and may be co-located with the transmitting antenna 120. Thus, the proximity sensing strip 126 may sense the presence of a human body part nearby the transmitting antenna 120. More than one proximity sensing element may be present in the embodiments of the present disclosure, as described in greater detail below.

The integrated circuit 118 in an embodiment may be operatively connected to the transmitting antenna 120 and to the proximity sensing element 126. As described above, in a particular non-limiting, exemplary embodiment, the proximity based transmitting antenna power management system 132 may comprise firmware code instructions operating upon the integrated circuit 118. The integrated circuit 118 in an embodiment may supply low-level voltage to the proximity sensing strip 126, in order for the proximity sensing strip 126 to emit a capacitance field, and may detect changes in the capacitance field of the proximity sensing strip 126 in an example embodiment. The integrated circuit 118 in an embodiment may also supply power to the transmitting antenna 120, and may execute instructions from the processor 102 to decrease the power level supplied to the transmitting antenna 120 upon detection by the proximity sensing strip 126 of a nearby human body part.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. For example, any of the above may operate as integrated circuit 118 to execute instructions of the proximity based transmitting antenna power management system 132. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include software, including firmware embedded at a device, such as a Intel® Core class processor, ARM® brand processors, Qualcomm® Snapdragon processors, or other processors and chipset, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
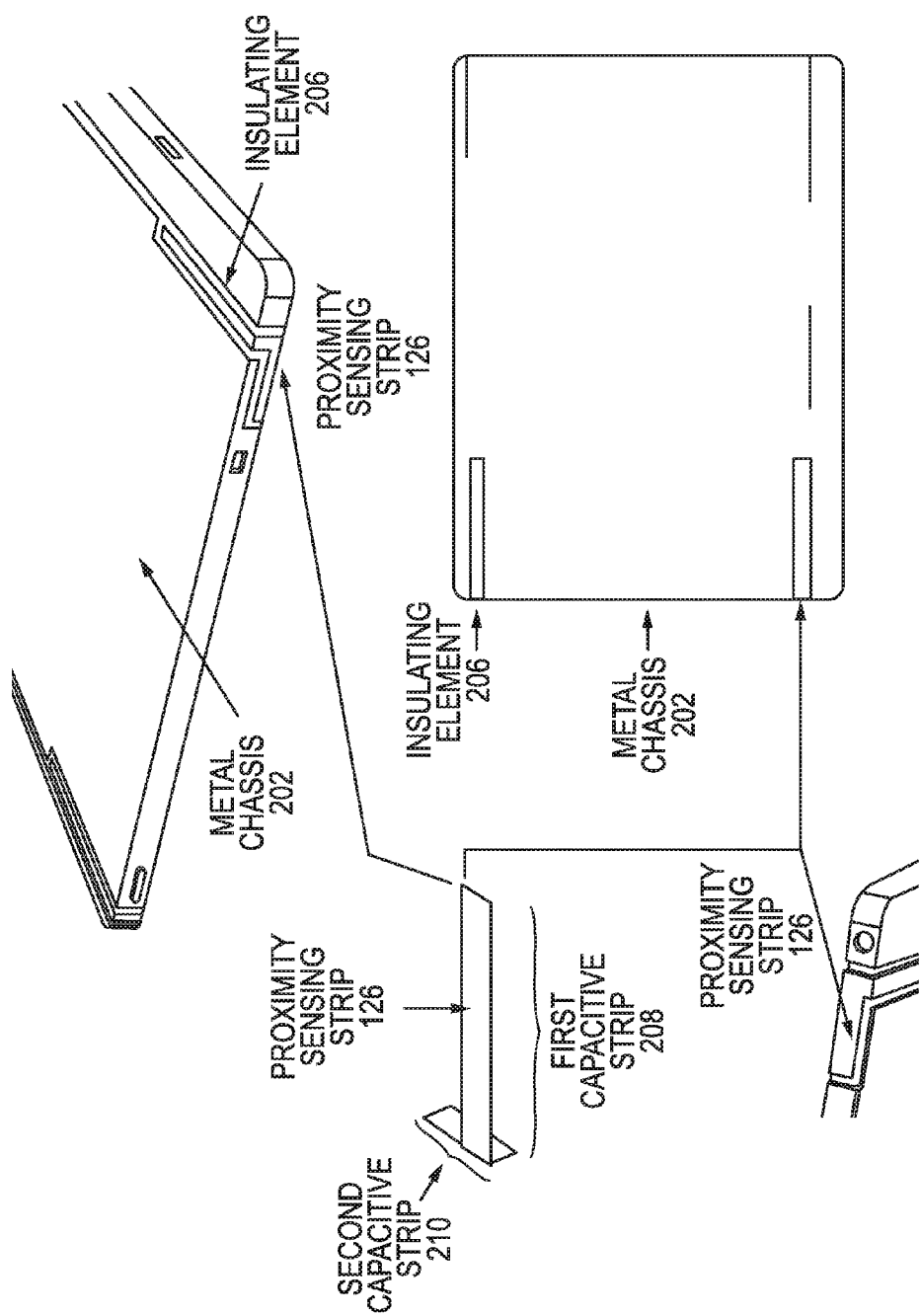
FIG. 2 is a graphical illustration of a metal chassis incorporating a proximity sensing element such as a proximity sensing strip according to an embodiment of the present disclosure.

FIG. 2 is a graphical illustration of a metal chassis incorporating a proximity sensing element such as a proximity sensing strip according to an embodiment of the present disclosure. The metal chassis 202 in an embodiment may comprise an outer metal case or shell of an information handling system such as a tablet device, laptop, or other mobile information handling system. Chassis 202 may also contain internal structure to support features of the information handlings system including features as set forth in FIG. 1. As shown in FIG. 2, a metallic chassis 202 in an embodiment may incorporate a proximity sensing element such as a proximity sensing strip 126 comprised of the same metallic material of which the metallic chassis 202 is composed. The surface of the proximity sensing element 126 of an embodiment may lie flush with the surface of the metallic chassis 202. Each non-exterior side of the proximity sensing element 126 may also be surrounded on each side by an insulating element 206. As also shown in FIG. 2, the proximity sensing element 126 in an embodiment may comprise a first 208 and second capacitive strip 210 oriented disparately to one another. For example, the first capacitive strip 208 may lie flush with one of the six exterior sides of the metal chassis (including the top, bottom, left side, right side, front, and back of the metal chassis 202), and the second capacitive strip 210 may lie flush with another of the six sides of the metal chassis 202. Each exterior surface of the capacitive strip 208 and 210 may be flat or curvilinear in shape.

In one example embodiment, and as indicated by FIG. 2, the first capacitive strip 208 of the proximity sensing element 126 is a surface that in an embodiment may lie flush with the top of the metal chassis 202, and the second capacitive strip 210 of the proximity sensing element 126 is a surface that may lie flush with the side of the metal chassis 202. For example, a strip of metallic of inductive substance may be the first capacitive strip 208. In another example, a second strip of metallic or inductive substance may be the second capacitive strip 210. Alternatively, the first capacitive strip 208 of the proximity sensing element 126 in another embodiment is a surface that may lie flush with the bottom of the metal chassis 202, and the second capacitive strip 210 of the proximity sensing element 126 is a surface may lie flush with the front or rear of the metal chassis 202.

Each of these embodiments allows the proximity sensing element 126 to detect a change in capacitance across either the first capacitive strip 208 or the second capacitive strip 210, and thus, to detect proximity of a human body part located in two different directions from the metal chassis. As an example, in an embodiment where the first capacitive strip 208 of the proximity sensing element 126 lies flush with the top of the metal chassis 202, and the second capacitive strip 210 of the proximity sensing element 126 lies flush with the side of the metal chassis 202, the proximity sensing element 126 may detect a human body part located above or to the side of the metal chassis 202. Similarly, if the second capacitive strip 210 lies flush with the right side, left side, front, or rear exterior surface of the metal chassis 202, the proximity sensing element 126 may detect a human body part located to the right, left, front, or rear of the metal chassis 202, respectively.

The insulating element 206 in an embodiment may be comprised of any insulating element that may be used in an injection molding technique. Specifically, the insulating element 206 may include, but may not be limited to resins, such as crystalline polymer polyphenylene sulfide (PPS), and polybutylene terephthalate (PBT), as well as hybrid resins incorporating PPS or PBT with glass fiber. The insulating element 206 may be incorporated into the metal chassis 202 via a nano-manufacturing technology (NMT) injection molding process, as described in greater detail below.

Figure 3A:
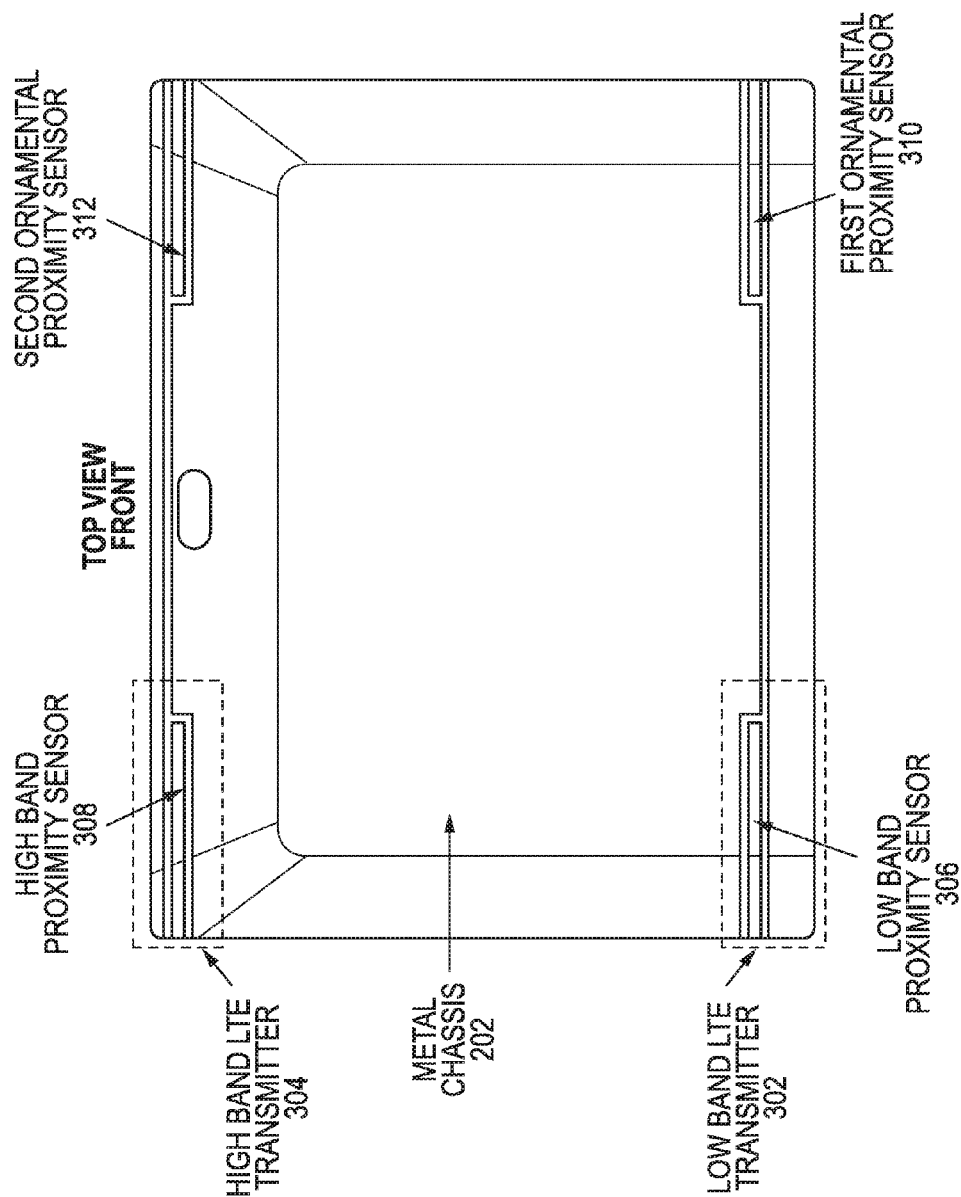
FIG. 3A is graphical illustration of a top view of a metal chassis incorporating a proximity sensing element according to an embodiment of the present disclosure.

FIG. 3A is a graphical illustration of a top view of a metal chassis incorporating a proximity sensing element such as a proximity sensing strip according to an embodiment of the present disclosure. As shown in FIG. 3A, and as described above, the information handling system of the present disclosure may comprise more than one transmitting antenna and more than one proximity sensing element. As an example, and as shown in FIG. 3A, the metal chassis 202 in an embodiment may enclose a low band LTE transmitter 302, located near the rear, right side of the metallic chassis 202, and a high band LTE transmitter 304, located nearby the front right side of the metallic chassis 202. The metal chassis 202 in an embodiment may also incorporate a high band proximity sensor 308, located nearby the high band LTE transmitter 304, and may incorporate a low band proximity sensor 306 located nearby the low band LTE transmitter 302. The low band proximity sensor 306 in an embodiment may function to detect human body parts nearby the low band LTE transmitter 302. The high band proximity sensor 308 in an embodiment may function to detect human body parts nearby the high band LTE transmitter 304. In further embodiments, the high band proximity sensor 308 and low band proximity sensor 306 may extend across the full width of the metal chassis 202.

The metal chassis 202 in an embodiment may further include one or more ornamental proximity sensors, 310 and 312. The first and second ornamental proximity sensors 310 and 312 (respectively) in an embodiment may be incorporated into the metal chassis 202 in order to provide an ornamentally symmetric appearance to portions of the metal chassis in which transmitters are not located. In other words, a proximity sensing element may not be required on the left side of the metal chassis 202 due to a lack of transmitting antennas on that side, but the first and second ornamental proximity sensors 310 and 312 may be incorporated into the metal chassis 202 in order to ensure the top right side of the metal chassis 202 appears to be symmetric when compared to the top left side of the metal chassis 202. As described above, each proximity sensing element may comprise a first and second capacitive strip oriented disparately to one another. For example, the first capacitive strip (not shown) may lie flush with one of the six exterior sides of the metal chassis 202 (including the top, bottom, left side, right side, front, and back of the metal chassis 202), and the second capacitive strip (not shown) may lie flush with another of the six sides of the metal chassis 202.

In one example embodiment, and as shown in FIG. 3A, the first capacitive strip of the high band proximity sensor 308 and the first capacitive strip of the low band proximity sensor 306 may both lie flush with the top exterior surface of the metal chassis 202. In further embodiments of the present disclosure, the second ornamental proximity sensor 312 may have a first and second capacitive strip shaped and oriented in the same manner as the first and second capacitive strips of the low band proximity sensor 306. The first ornamental proximity sensor 310 of an embodiment may similarly have a first and second capacitive strip shaped and oriented in the same manner as the first and second capacitive strips of the high band proximity sensor 308. Further, the first capacitive strips of the first and second ornamental proximity sensors 310 and 312 respectively may lie flush with the top exterior surface of the metal chassis 202. In an alternative embodiment, the first and second ornamental proximity sensors 310 and 312 may be replaced with a third proximity sensor and fourth proximity sensor. In such a way, the low band proximity sensor 306, high band proximity sensor 308, third and fourth proximity sensors (located in place of the first and second ornamental proximity sensors 310 and 312) would be capable, in combination with one another, of detecting a human body part nearby any corner of the metal chassis 202.

As shown in FIG. 3A, the metal chassis 202 may also incorporate one or more transmitting antennas. For example, the metal chassis 202 may incorporate a high-band transmitting antenna 304, and a low-band transmitting antenna 306. Alternatively, the metal chassis 202 may only include a single transmitting antenna, a single transceiving antenna capable of receiving and transmitting, and/or a more than one transceiving antennas. Each of these antennas may be subject to the FCC regulations on specific absorption rate (SAR) described above. In an example embodiment and as shown in FIG. 3A, the high band proximity sensor 306 may be located nearby the high band LTE transmitter 304, and the low band proximity sensor 308 may be located nearby the low band LTE transmitter 302. In other example embodiments, each of a plurality of proximity sensing strips may be located nearby each of a plurality of transmitting antennas. In such a way, each antenna may have a nearby proximity sensor that allows the proximity based transmitting antenna power management system to detect a human body part nearby a specific one of the plurality of antennas, and to consequently decrease power to just that individual antenna.

Figure 3B:
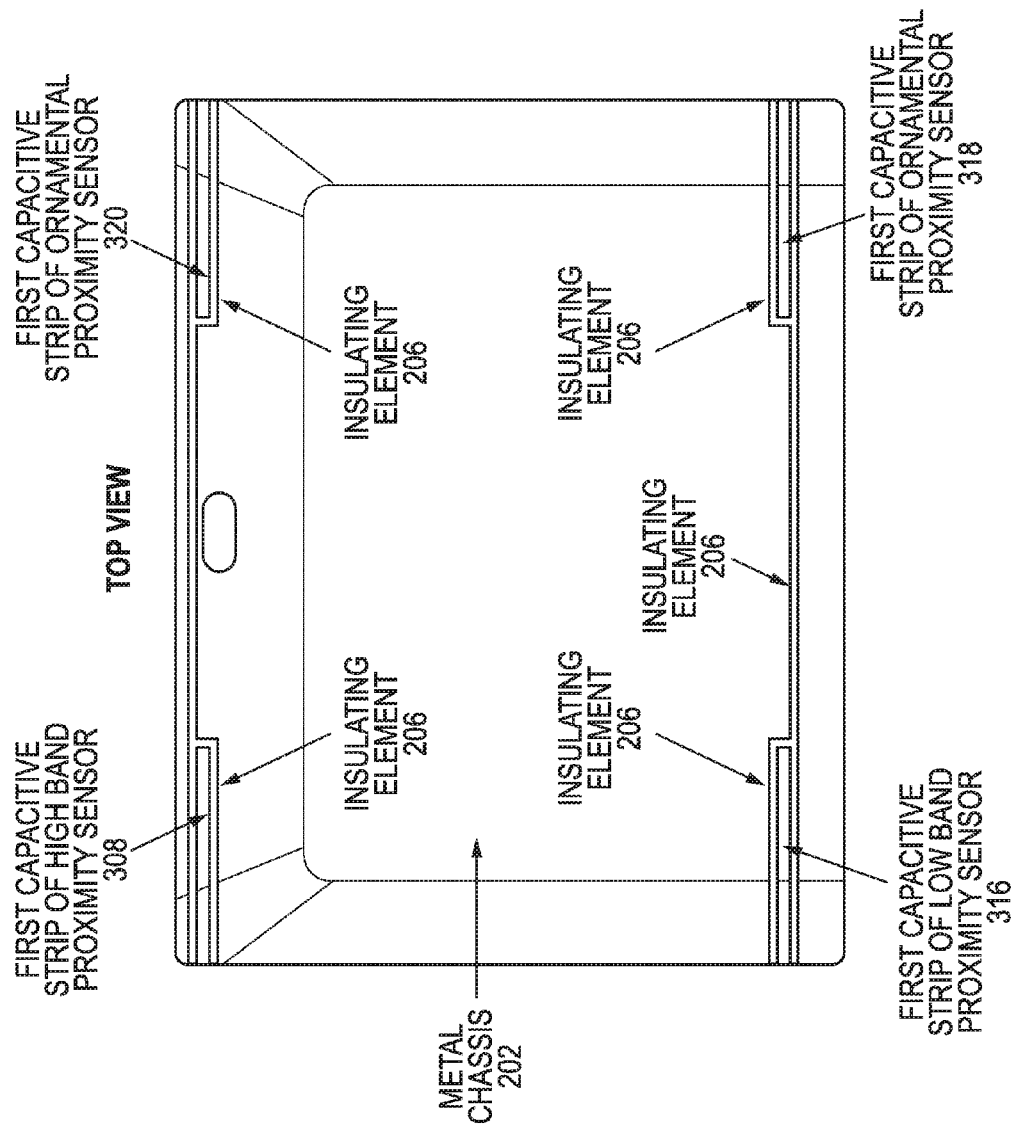
FIG. 3B is a graphical illustration of a first capacitive element of a proximity sensor embedded within a metal chassis according to an embodiment of the present disclosure.

FIG. 3B is a graphical illustration of a first capacitive strip of a proximity sensor embedded within a metal chassis according to an embodiment of the present disclosure. As described above, a proximity sensing element may comprise a first and second capacitive strip oriented disparately from another. For example, the first capacitive strip (not shown) may lie flush with one of the six exterior sides of the metal chassis 202 (including the top, bottom, left side, right side, front, and back of the metal chassis 202), and the second capacitive strip (not shown) may lie flush with another of the six sides of the metal chassis 202. As shown in FIG. 3B, a first capacitive strip of the high band proximity sensor 314, a first capacitive strip of the low band proximity sensor 316, a first capacitive strip of the first ornamental proximity sensor 318, and a first capacitive strip of the second ornamental proximity sensor 320 may all lie flush with the top exterior of the metal chassis 202.

As also shown in FIG. 3B, each non-exterior side of the first capacitive strip of the high band proximity sensor 315, the first capacitive strip of the low band proximity sensor 316, the first capacitive strip of the first ornamental proximity sensor 318, and the first capacitive strip of the second ornamental proximity sensor 320 in an embodiment may be surrounded by an insulating element 206. The insulating element 206 in an embodiment may operate to electrically insulate the first capacitive strip of the high band proximity sensor 314 and first capacitive strip of the low band proximity sensor 316 from the metal chassis 202, in order to allow the first capacitive strip of the high band proximity sensor 314 and first capacitive strip of the low band proximity sensor 316 to each generate their own, individual capacitive fields.

Figure 3C:
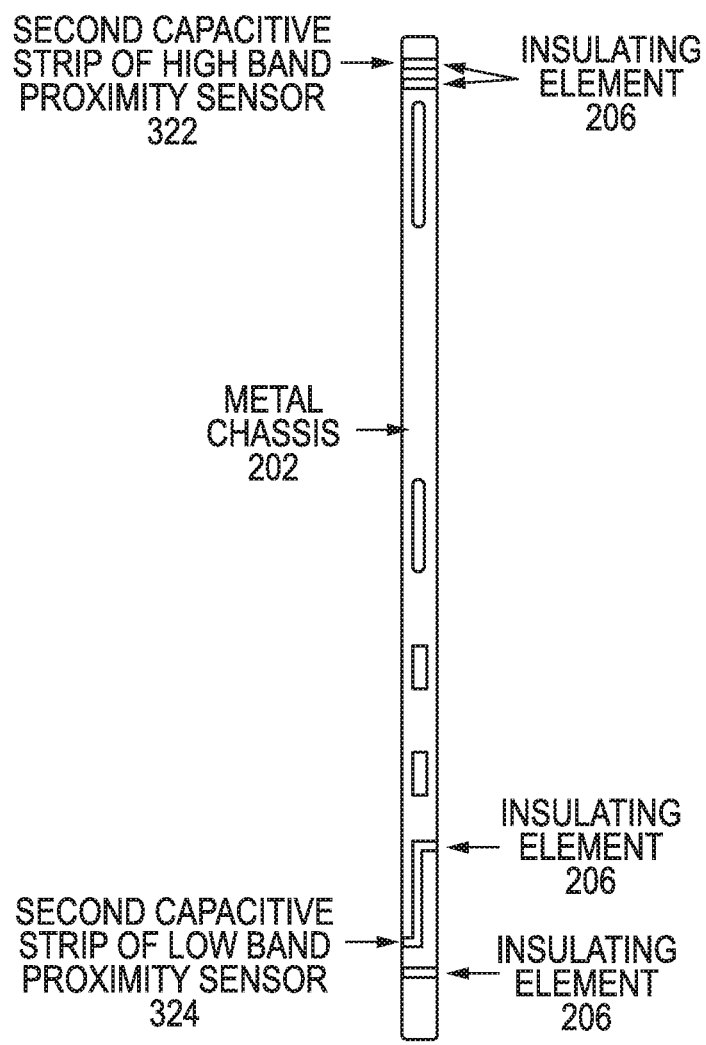
FIG. 3C is a graphical illustration of a left side view of a metal chassis incorporating a proximity sensing element according to an embodiment of the present disclosure.

FIG. 3C is a graphical illustration of a left side view of a metal chassis incorporating a proximity sensing element according to an embodiment of the present disclosure. As shown in FIG. 3C, the metal chassis 202 may incorporate a second capacitive strip of the high band proximity sensor 322 and a second capacitive strip of the low band proximity sensor 324. As described above, each non-exterior side of the second capacitive strip of the high band proximity sensor 322 and the second capacitive strip of the low band proximity sensor 324 in an embodiment may be surrounded by an insulating element 206. As also described above, the low band proximity sensor may be comprised of a first capacitive strip (not shown) and a second capacitive strip 324, and the first capacitive strip (not shown) may lie flush with the top exterior surface of the metal chassis 202. As shown in FIG. 3C, the second capacitive strip of the low band proximity sensor 324 may lie flush with the left side exterior surface of the metal chassis 202.

Figure 3D:
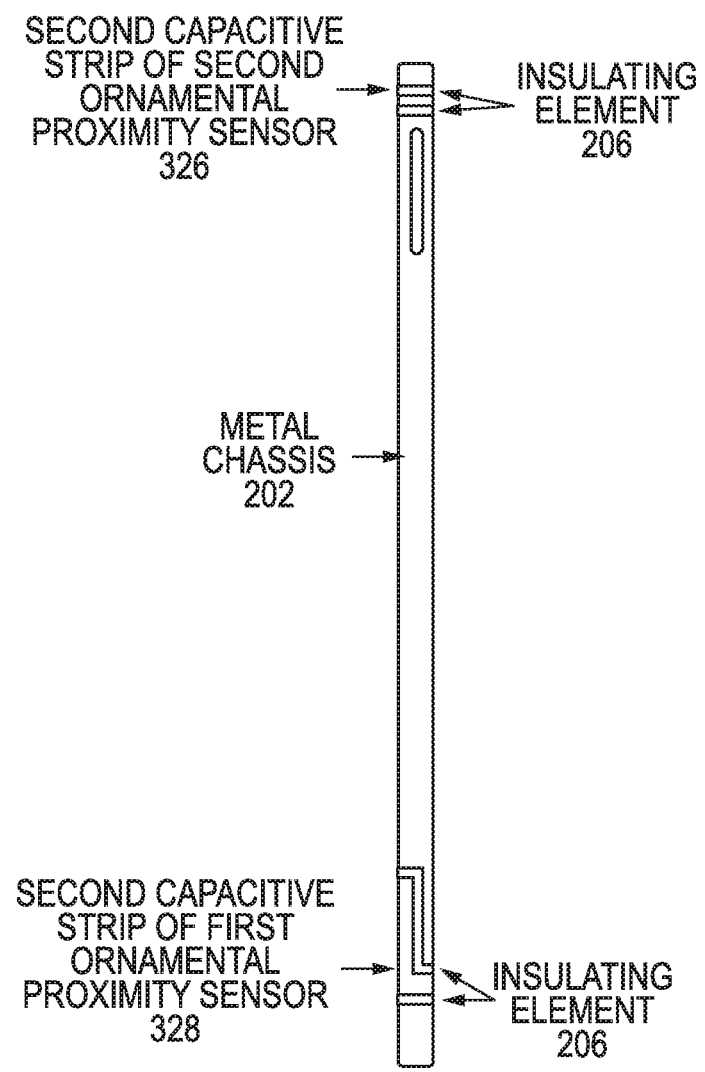
FIG. 3D is a graphical illustration of a right side view of a metal chassis incorporating an ornamental proximity sensing element according to an embodiment of the present disclosure.

FIG. 3D is a graphical illustration of a left side view of a metal chassis incorporating an ornamental proximity sensing element according to an embodiment of the present disclosure. As shown in FIG. 3D, the metal chassis 202 may incorporate a second capacitive strip of the first ornamental proximity sensor 328 and a second capacitive strip of the second ornamental proximity sensor 326. As described above, each non-exterior side of the second capacitive strip of the first ornamental proximity sensor 328 and the second capacitive strip of the second ornamental proximity sensor 326 in an embodiment may be surrounded by an insulating element 206. As also described above, the first ornamental proximity sensor may be comprised of a first capacitive strip (not shown) and a second capacitive strip 328, and the first capacitive strip (not shown) may lie flush with the top exterior surface of the metal chassis 202. As shown in FIG. 3D, the second capacitive strip of the first ornamental proximity sensor 328 may lie flush with the left side exterior surface of the metal chassis 202.

Figure 4:
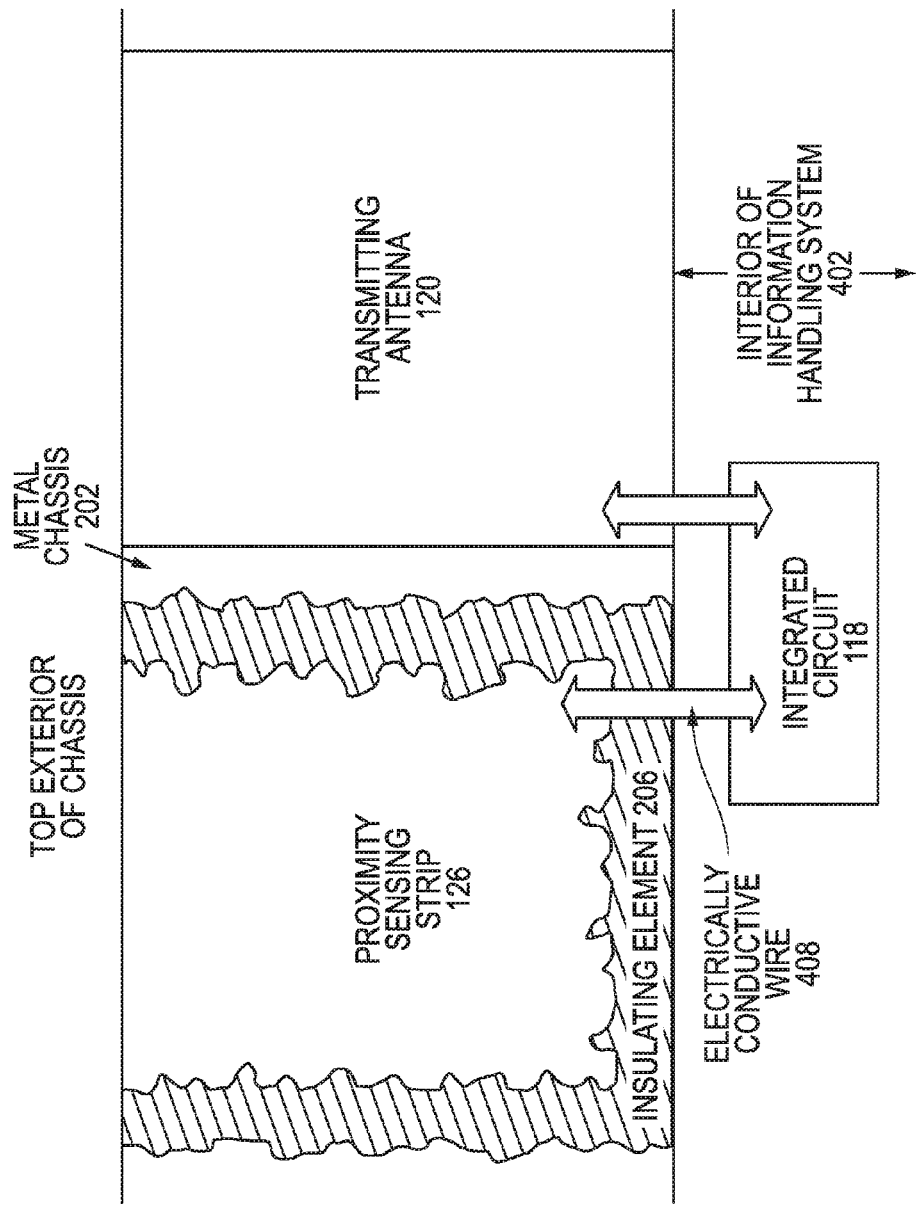
FIG. 4 is a graphical depiction of a cross-sectional view of a metal chassis incorporating a proximity sensor according to an embodiment of the present disclosure.

FIG. 4 is a graphical depiction of a cross-sectional view of a metal chassis incorporating a proximity sensor according to an embodiment of the present disclosure. As shown in FIG. 4, the metal chassis 202 in an embodiment may enclose an interior of an information handling system 402 that includes an integrated circuit 118, and may incorporate a transmitting antenna 120, the proximity sensing element 126 and the insulating element 206. In another embodiment, the transmitting antenna 120 may be located on the interior of the metal chassis 202. In yet another embodiment, part of the metal chassis 202 may act as the transmitting antenna. The metal chassis material 202 may also supplement the antenna transmission capabilities in embodiments where the metal chassis 202 does not act as the transmitting antenna. As described above, many LTE-enabled devices place the proximity sensor beneath the metal chassis 202 (within the interior of the information handling system) and machine a gap in the chassis under which the proximity sensor will be located. However, placing the proximity sensor directly beneath the metal chassis surface would inhibit a nearby human body part from altering the proximity sensor's capacitance, and thus, would inhibit the proximity sensor from sensing the nearby body part. In order to overcome this issue, such devices insert a bonded radio-frequency transparent window within the gap in the chassis after the chassis has been created. As also described above, this solution creates multiple process steps and uses several parts that would be unnecessary if the proximity sensor could be formed from the chassis material and integrated into the chassis, without the need for a secondarily bonded radio frequency transparent window.

As shown in FIG. 4, an embodiment of the present disclosure may form the proximity sensing element 126 from the metal chassis material 202 and integrate the proximity sensing element 126 such that its exterior surface lies flush with the exterior surface of the metal chassis 202 and such that its sides abut the insulating element 206. In such a way, the insulating element 206 may insulate the proximity sensing element 126 from the metal chassis 202. Thus, the metal chassis 202 may not interfere with the ability of a nearby human body part to alter the capacitance across the surface of the proximity sensing element 126, and transmit a message indicating this change in capacitance to the proximity based transmitting antenna power management system.

The proximity sensing element 126 in an embodiment may also be operatively connected to the integrated circuit 118, by, for example, an electrical conductor. For example, a bonded electrically conductive wire may be used. In other embodiments, other electrical conductors may be used, including, but not limited to electrically conductive epoxies, tapes, or soldering material. The integrated circuit 118 in such an embodiment may supply the low-level voltage to the proximity sensing element 126 required to generate the low-level local electric field of the proximity sensing element 126. As described above, when a human body part comes near the surface of the proximity sensing element 126 supplied with low-level voltage in an embodiment, the electric field of the proximity sensing element 126 may change, causing the mutual capacitance of the proximity sensing element 126 to change as well. The integrated circuit 118 in an embodiment may be capable of recognizing this change in the mutual capacitance of the proximity sensing element 126.

The chassis 202 in an embodiment may further include a transmitting antenna 120 which may transmit radio frequency transmissions according to LTE standard requirements. The integrated circuit 118 may supply power to the transmitting antenna 120 in order to power its transmissions. The transmitting antenna 120 in an embodiment may need to comply with the FCC requirements relating to specific absorption rate (SAR) for users of the device. The FCC requirements may impose a need to decrease the power supplied to the transmitting antenna 120 in an embodiment when the presence of a nearby human body part is detected. The integrated circuit 118 in an embodiment may be capable of regulating the power supplied to the transmitting antenna 120. For example, the proximity based transmitting antenna power management system in an embodiment may respond to the message indicating a change in capacitance across the proximity sensing element 126 by instructing the integrated circuit 118 to decrease the power supplied to the transmitting antenna 120. In such a way, the integrated proximity based transmitting antenna power management system may ensure the transmitting antenna 120 emits only low-level electromagnetic fields, when a human body part is detected nearby.

In other embodiments, and as described above, a plurality of transmitting antennas may be included within the metal chassis 202, such as for example, a high-band transmitting antenna, and a low-band transmitting antenna. In yet other embodiments, and as also described above, the metal chassis 202 may incorporate a single transceiving antenna capable of receiving and transmitting, and/or more than one transceiving antennas. Such embodiments may also incorporate a plurality of proximity sensing elements 126, each located nearby one of each of the plurality of antennas. In such a way, each antenna may have a nearby proximity sensor that allows the proximity based transmitting antenna power management system to detect a human body part nearby a specific one of the plurality of antennas, and to consequently decrease power to just that individual antenna.

In another aspect of an embodiment, the proximity sensing element 126 may comprise a first and second capacitive strip, oriented disparately to one another, as described above. In such an embodiment, the integrated circuit 118 may be capable of detecting a change in capacitance across only one of these capacitive strips, such as, for example, the first capacitive strip lying flush with the right side of the metal chassis 202. In such an embodiment, the integrated circuit 118 may be capable of registering the nearby presence of a human body part on the right side of the metal chassis 202, and distinguishing that presence from a presence located near the top surface of the metal chassis 202. Thus, the integrated circuit may be capable of sensing the presence of a human body part in more than one-direction, and may be capable of deciphering between those two directions.

In a further embodiment, more than one proximity sensing element 126 may be operatively connected to the integrated circuit 118. As described above, multiple proximity sensing elements 126 may be incorporated within the metal chassis 202 in any number of orientations with respect to one another and with respect to the outer dimensions of the metal chassis 202. Adjusting the orientation and number of proximity sensing elements 126 in such a way may enable the multiple proximity sensing elements 126 to work in tandem to identify and locate a human body part with respect to the metal chassis 202. In an embodiment where each of these proximity sensing elements 126 are operatively connected to the integrated circuit 118, or are each individually operatively connected to separate integrated circuits, and each of the plurality of integrated circuits are operatively connected to one another and the proximity based transmitting antenna power management system, the proximity based transmitting antenna power management system may detect changes in the capacitance of one or more proximity sensors, and compare those changes in order to determine the three-dimensional position of the human body part with respect to the metal chassis 202. For example, if the capacitance of a proximity sensing element 126 located on the right of the metal chassis 202 changed a great deal, the capacitance of a proximity sensing element 126 located on the top of the metal chassis 202 changed to a lesser degree, and the capacitance of a proximity sensing element 126 located on the left of the metal chassis 202 did not change, the proximity based transmitting antenna power management system may determine the human body part is located to the right, and slightly higher relative to the metal chassis 202.

Figure 5:
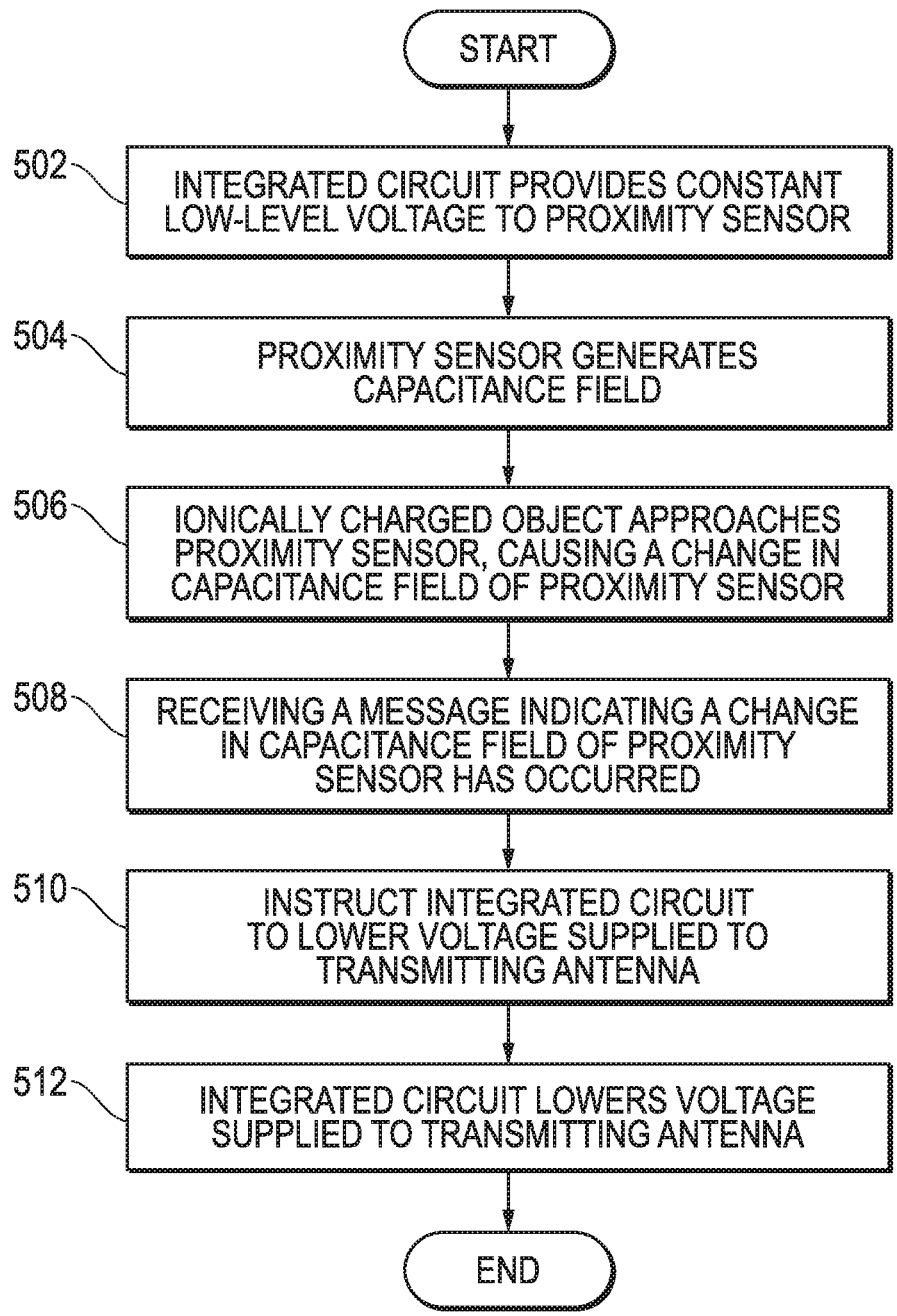
FIG. 5 is a flow diagram illustrating a method of instructing an integrated circuit to decrease power supplied to a transmitting antenna nearby a human body part according to an embodiment of the present disclosure.

FIG. 5 is a flow diagram illustrating a method of instructing an integrated circuit to decrease power supplied to a transmitting antenna nearby a human body part according to an embodiment of the present disclosure. At block 502, in an embodiment, an integrated circuit may provide a constant low-level voltage to a proximity sensor. As described above, the integrated circuit may be operatively connected to a proximity sensor incorporated within a metal chassis 202 enclosing an information handling system including the integrated circuit. As also described above, the proximity sensor may be capable of generating two different electromagnetic fields, each across one of two capacitive strips oriented disparately to one another. In such a way, the proximity sensor in an embodiment may operate to sense proximity of objects in two different directions. Establishment of a baseline capacitance across the two capacitive strips may be tuned based on the size of the proximity sensor dimensions in order to establish the baseline capacitance electromagnetic field. As also described above, in an embodiment, more than one proximity sensor may be incorporated within the metal chassis 202, each located nearby an individual transmitting antenna. In such a way, the proximity sensor in such an embodiment may operate to sense proximity of a human body part nearby one transmitting antenna while simultaneously determining the human body part is not nearby a second transmitting antenna.

At block 504, the proximity sensor in an embodiment may generate a capacitance field. As also described above, by providing the low-level voltage to the proximity sensor, the integrated circuit may cause the proximity sensor to emit a low-level electro-magnetic field or capacitance field. In an example embodiment, proximity sensor firmware may execute on an integrated circuit to generate a baseline capacitance. In one embodiment, a baseline capacitance of 30-50 pF may be established.

At block 506, in an embodiment, an ionically charged object may approach the proximity sensor, causing a change in the proximity sensor's capacitance field. A human body part is an ionically charged object whose presence may disrupt the capacitance of nearby electro-magnetic fields. As described above, when a human body part comes into close proximity with the proximity sensor, the presence of the body part changes the local electric field, which may also alter the mutual capacitance across the proximity sensor. The integrated circuit may register the capacitance change at one or more locations across the surface of the proximity sensor in order to determine the position of the human body part with reference to the dimensions of the proximity sensor. Change in capacitance may be either an increase or a decrease in capacitance in various embodiments. As also described above, the metal chassis 202 may incorporate multiple proximity sensors and each proximity sensor may be capable of sensing objects oriented in two different directions from the sensor. Thus, capacitance changes across only one capacitive strip of a proximity sensor, or across one proximity sensor, but not another proximity sensor may indicate the position of the body part with reference to the metal chassis 202, and with reference to each transmitting antenna.

At block 508, in an embodiment, the proximity based transmitting antenna power management system may receive a message from the integrated circuit indicating the change in the proximity sensor's capacitance field has occurred. As described above, the proximity sensor may be operatively connected to an integrated circuit, which may further be operably connected to the processor operating machine-readable code instructions of the proximity-based transmitting antenna power management system. As such, the proximity-based transmitting antenna power management system may receive a message from the integrated circuit of a change in capacitance across a proximity sensor, indicating a human body part in the vicinity of the proximity sensor. As also described above, the metal chassis 202 may incorporate a plurality of proximity sensors and/or a plurality of transmitting/transceiving antennas. In such an embodiment, the proximity-based transmitting antenna power management system may be capable of determining a change in capacitance of a portion of one or only one of the proximity sensors, and determining the location of the detected human body part with reference to each of the transmitting/transceiving antennas.

At block 510, in an embodiment, the proximity-based transmitting antenna power management system may instruct the integrated circuit to lower the voltage supplied to the transmitting antenna nearest the proximity sensor. As described above, the integrated circuit operably connected to the proximity sensor may also be operably connected to the transmitting antenna. Once the proximity-based transmitting antenna power management system detects a change in capacitance of the proximity sensor nearest the antenna, it may instruct the integrated circuit to lower the voltage supplied to the transmitting antenna in order to decrease the radio frequency electro-magnetic field to which the detected nearby human body part is exposed.

At block 512, the integrated circuit in an embodiment may lower the voltage supplied to the transmitting antenna. As described above, the proximity-based transmitting antenna power management system may be capable of communicating instructions to a plurality of integrated circuits, each operably connected to an individual pair of a transmitting antenna and a nearby proximity sensor. In such an embodiment, the proximity based transmitting antenna power management system operatively connected to each proximity sensor may be capable of detecting the presence of an object nearby one antenna, and determine that object is not nearby a separate antenna, and decrease power to only the antenna nearby the object. Such a process would enable the information handling system to comply with FCC regulations while simultaneously maintaining the best allowable communications in the LTE spectrum.

Figure 6A:
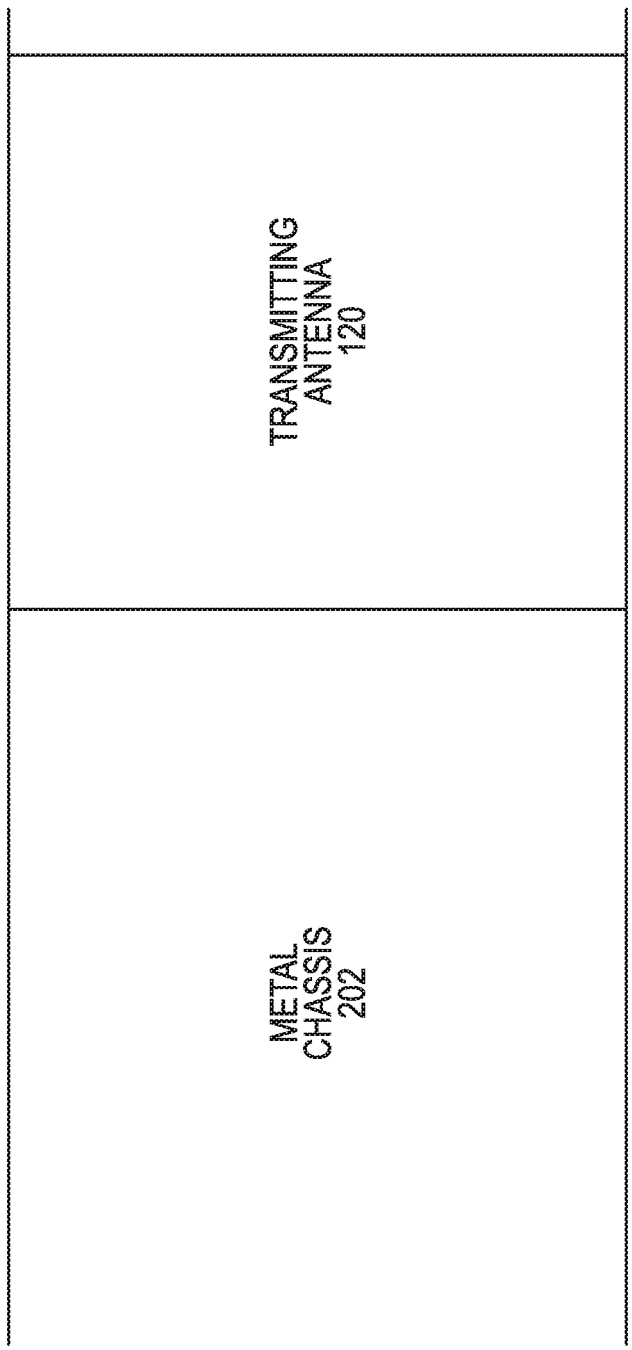
FIG. 6A is a graphical illustration of a cross-sectional view of a metallic chassis according to an embodiment of the present disclosure.

FIGS. 6A-6E are graphical illustrations of a cross-sectional view of a chassis during multiple stages of a manufacturing process for fabricating a metallic chassis having an embedded proximity sensing element according to an embodiment of the present disclosure. FIG. 6A is a graphical illustration of a cross-sectional view of a chassis material prior to performance of a manufacturing process for fabricating a metallic chassis having an embedded proximity sensing element according to an embodiment of the present disclosure. The metal chassis 202 in an embodiment may act as the transmitting antenna 120, as the metal chassis 202 may be composed of material capable of generating an electro-magnetic radio transmission. Alternatively, and as shown in FIG. 6A, the cross-section of the metal chassis 202 may include a transmitting antenna 120 on two or more sides, and the transmitting antenna 120 portion may have a cross-sectional depth equivalent to the metal chassis 202 such that the top surface of the transmitting antenna 120 is flush with the top surface of the metal chassis 202, and the bottom surface of the transmitting antenna 120 lies flush with the bottom surface of the metal chassis 202. In other embodiments, the transmitting antenna 120 may have a cross-sectional depth greater than, or smaller than the cross-sectional depth of the metal chassis 202, and/or the transmitting antenna 120 may be enclosed within and connected to the metallic chassis 202, rather than being incorporated within it. The walls of the transmitting antenna 120 in an embodiment may also be separated from the metal chassis 202 by an insulating material (not shown). The portion of the metal chassis 202 in an embodiment including or comprising the transmitting antenna 120 may have a uniform composition throughout, such as, for example being composed of a solid structure of anodized aluminum.

Figure 6B:
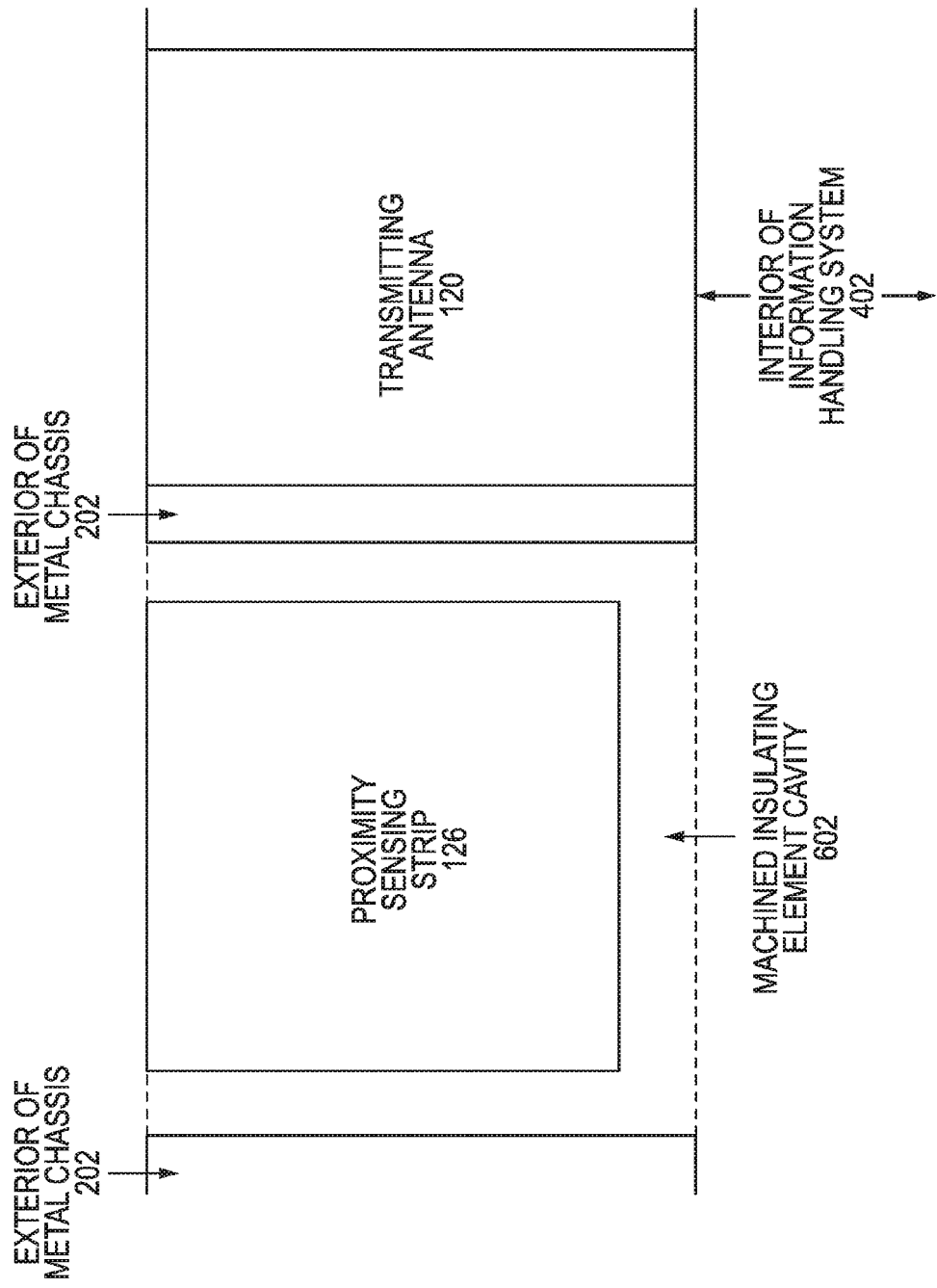
FIG. 6B is a graphical illustration of a cross-sectional view of a machined insulating element cavity formed within a metal chassis according to an embodiment of the present disclosure.

FIG. 6B is a cross-sectional graphical illustration of machining an insulating cavity within a metal chassis to form a proximity sensor according to an embodiment of the present disclosure. As shown in FIG. 6B, a machined insulating element cavity 602 may be formed within the metal chassis 202 by machining or milling out a portion of the metal chassis 202. Any form of machining or milling known in the art may be used to machine or mill out the portion of the metal chassis 202 to form the machined insulating element cavity. It is specifically contemplated that a nano-manufacturing technology (NMT), laser ablation, and metal etching may be used to machine or mill out the machined insulating element cavity 602. Additionally, it is contemplated the machined insulating element cavity 602 may be formed by machining or milling out portions of the metal chassis 202 either from the top surface of the metal chassis 202 or from the bottom surface of the metal chassis 202. In some embodiments, the proximity sensing element 126 may extend from the exterior of the metal chassis 202 cross-section to the interior of the metal chassis 202 cross-section abutting the interior of the information handling system 402. In other embodiments, the machined insulating element cavity 602 may not extend to abut the interior of the information handling system 402, but rather may only separate the sides of the proximity sensing strip from the sides of the metal chassis 202.

As shown in FIG. 6B, by forming the machined insulating element cavity 602, a portion of the metal chassis 202 is separated from the rest of the metal chassis 202. The portion of the metal chassis 202 which is separated from the rest may be adapted to form the proximity sensing element 126 in an embodiment. In other words, the proximity sensing element 126 in an embodiment may be formed out of the same material as the metal chassis 202. Further, the proximity sensing element 126 may take a shape defined by the shape of the machined insulating element cavity 602. As described above, the proximity sensing element 126 in an embodiment may be comprised of a first and second capacitive strip oriented disparately to one another. For example, the first capacitive strip (not shown) may lie flush with one of the six exterior sides of the metal chassis 202 (including the top, bottom, left side, right side, front, and back of the metal chassis 202), and the second capacitive strip (not shown) may lie flush with another of the six sides of the metal chassis 202. As also described above, in an example embodiment, once integrated with the metal chassis 202 in an embodiment, one capacitive strip of proximity sensing element 126 may lie flush with the top surface of the metal chassis 202 while the other capacitive strip of proximity sensing element 126 may lie flush with the side of the metal chassis 202. As such, the machined insulating element cavity 602 may form a three-dimensional cavity (not shown) extending through two walls of the metal chassis 202.

Figure 6C:
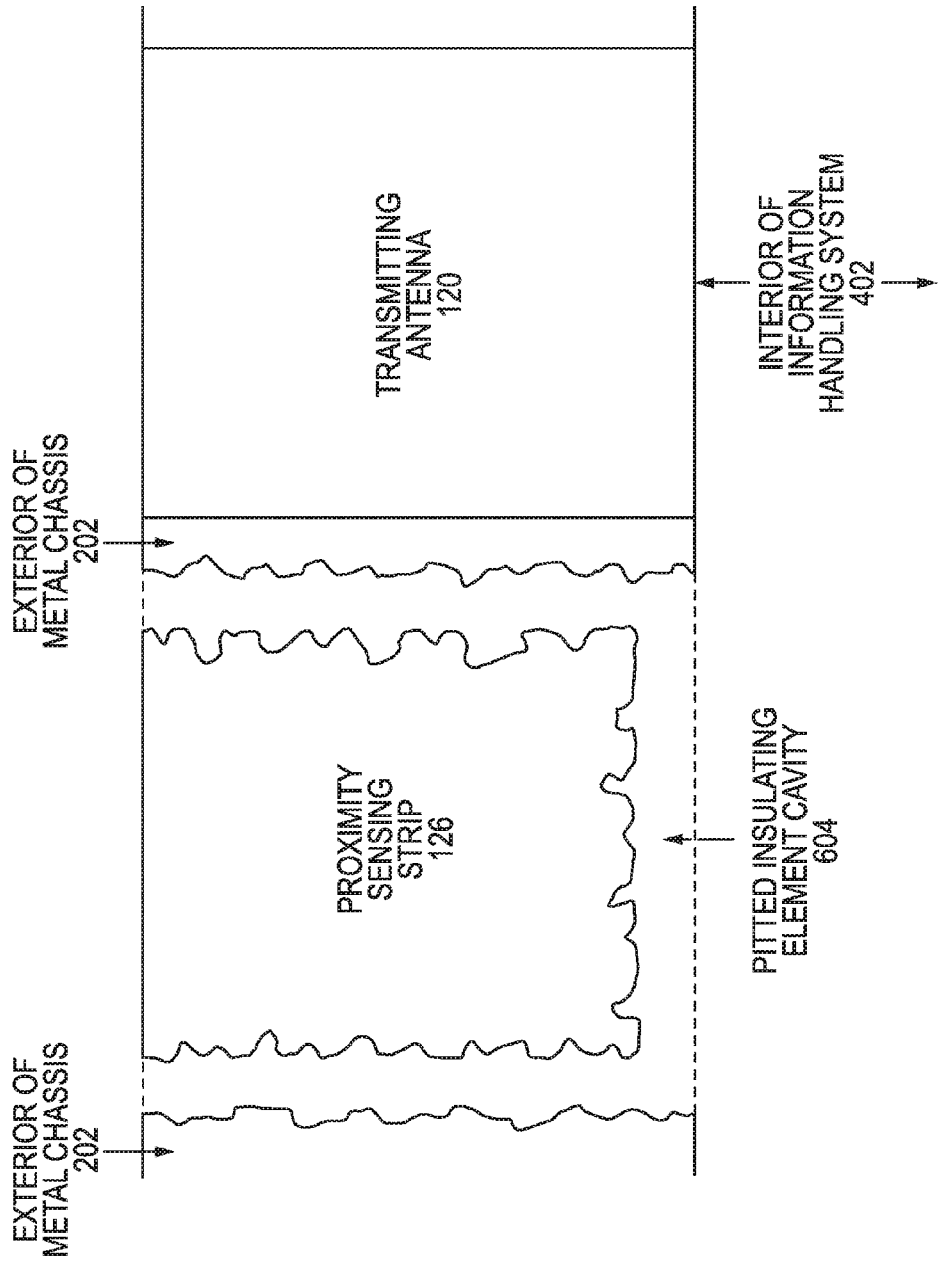
FIG. 6C is a graphical illustration of a cross-sectional view of a pitted insulating element cavity formed within a metal chassis according to an embodiment of the present disclosure.

FIG. 6C is a cross-sectional graphical diagram of the formation of a pitted insulating element cavity within a metal chassis according to an embodiment of the present disclosure. As shown in FIG. 6C, a pitted insulating element cavity 604 may be formed within the metal chassis 202, and surrounding the non-exterior surfaces of the proximity sensing element 126. The pitted insulating element cavity 604 in an embodiment may be formed by spraying an acid deposition upon the machined, smooth surfaces of both the proximity sensing element 126 and the metal chassis 202 that are exposed to the machined insulating element cavity. The acid deposition in such an embodiment may operate to form deep and non-uniform cavities within the smoothed walls of both the proximity sensing element 126 and the metal chassis 202 exposed to the machined insulating element cavity.

Figure 6D:
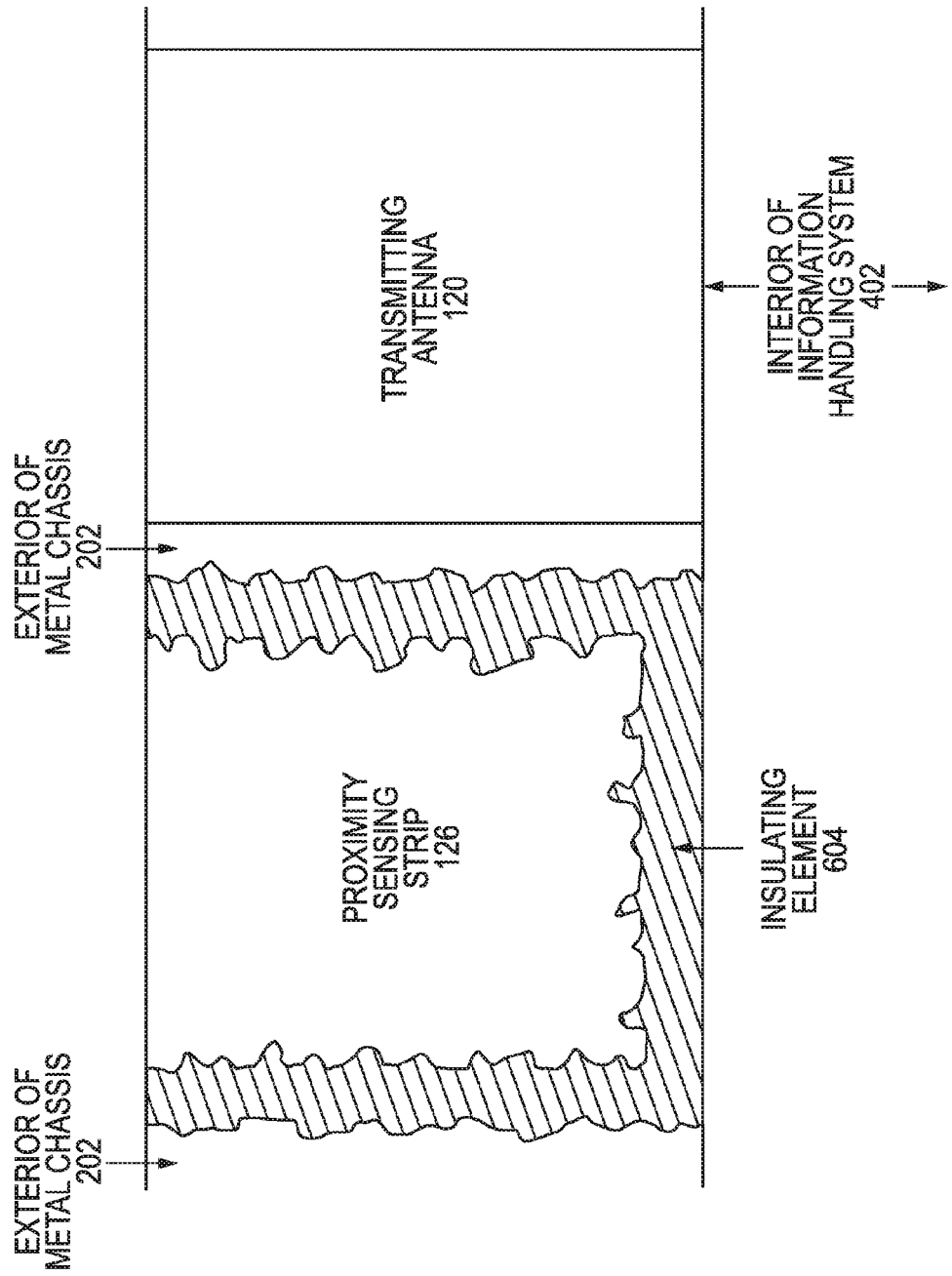
FIG. 6D is a graphical illustration of a cross-sectional view of an insulating element bonding a proximity sensing element within a metal chassis according to an embodiment of the present disclosure.

FIG. 6D is a cross-sectional graphical diagram of bonding a proximity sensor within a metal chassis with an insulating element according to an embodiment of the present disclosure. As shown in FIG. 6D, the proximity sensing element 126 in an embodiment may be bonded to the metal chassis 202 by injection of insulating element 206 within the pitted insulating element cavity 604. As described above, the insulating element 206 may comprise any insulating element that may be used in an injection molding technique. Specifically, the insulating element 206 in an embodiment may include, but may not be limited to resins, such as crystalline polymer polyphenylene sulfide (PPS), and polybutylene terephthalate (PBT), as well as hybrid resins incorporating PPS or PBT with glass fiber. The insulating element 206 in an embodiment may be injected into the pitted insulating element cavity such that it substantially fills the non-uniform cavities along the pitted walls of both the proximity sensing element 126 and the metal chassis 202. Once dried and hardened, the portions of the insulating element 206 within these non-uniform cavities in an embodiment may act as a plurality of anchors firmly attaching the metal chassis 202 to the proximity sensing element 126.

Figure 6E:
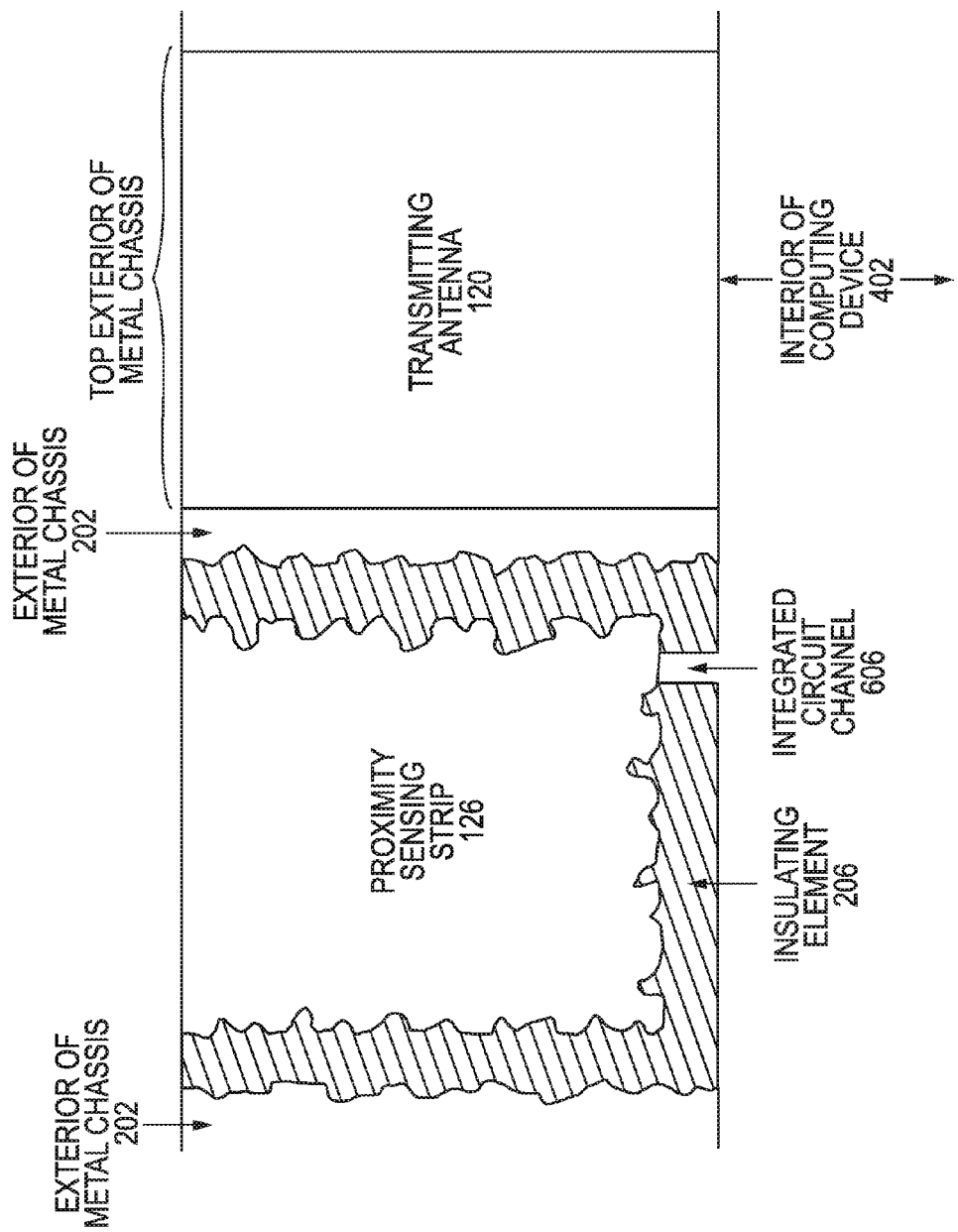
FIG. 6E is a graphical illustration of a cross-sectional view of an integrated circuit channel according to an embodiment of the present disclosure.

FIG. 6E is a cross-sectional graphical diagram of forming an integrated circuit channel throughout the depth of an insulating element according to an embodiment of the present disclosure. As shown in FIG. 6E, an integrated circuit channel 606 may be formed by machining or milling a channel through a portion of the insulating element 206 located between the proximity sensing element 126 and the integrated circuit (not shown), making a section of the bottom surface of the proximity sensing element 126 accessible from the information handling system the metal chassis 202 encloses. In such a way, the proximity sensing element 126 may be operatively connected to an integrated circuit lying within the interior of the information handling system 402 via an electric conductor disposed throughout he integrated circuit channel 606 to the proximity sensing element 126. The integrated circuit channel 606 may take any shape that allows for the insertion throughout its length of an electrical conductor, such as an electrically conductive wire operatively connected to the proximity sensing strip 126 on one end, and to an integrated circuit on the other end.

As described above, alternative embodiments may also include a proximity sensor having a first and second capacitive strip oriented disparately from one another. For example, the first capacitive strip (not shown) may lie flush with one of the six exterior sides of the metal chassis 202 (including the top, bottom, left side, right side, front, and back of the metal chassis 202), and the second capacitive strip (not shown) may lie flush with another of the six sides of the metal chassis 202. In such an embodiment, the insulating element 206 may be injected into two perpendicular walls of the metal chassis 202. Further, in such an embodiment, an integrated circuit channel 606 may be formed in the insulating element 206 injected within only one wall of the metal chassis 202, such that only one of the perpendicularly oriented capacitive strips of the proximity sensing element 126 may be operatively connected to an integrated circuit channel. Alternatively, an integrated circuit channel 606 may be formed in the insulating element 206 injected within both walls of the metal chassis 202, such that each of the perpendicularly oriented capacitive strips of the proximity sensing element 126 may be separately operatively connected to an integrated circuit, or each of the perpendicularly oriented capacitive strips of the proximity sensing elements 126 may be operatively connected to separate integrated circuits.

Figure 7:
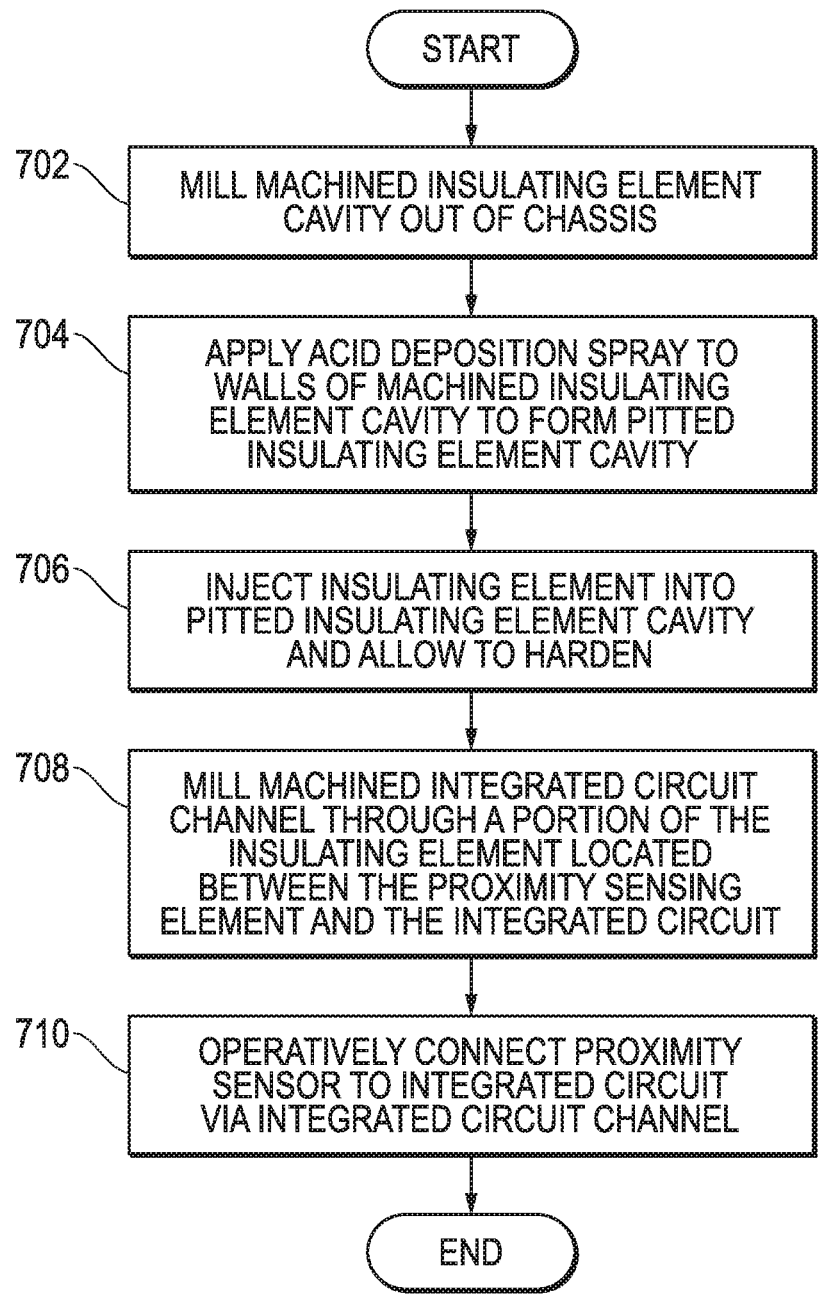
FIG. 7 is a flow diagram illustrating a manufacturing process for fabricating a metallic chassis having an embedded proximity sensing element according to an embodiment of the present disclosure.

FIG. 7 is a flow diagram illustrating a manufacturing process for fabricating a metallic chassis having an embedded proximity sensing element according to an embodiment of the present disclosure. As shown in FIG. 7, at block 702, a machined insulating element cavity may be machined or milled out of the metallic chassis. For example, as described above, a machined insulating element cavity may be formed within the metal chassis having a uniform composition throughout (e.g. a solid structure of anodized aluminum) by machining or milling out a portion of the metal chassis. As described above, the walls of the machined insulating element cavity may be relatively smooth. As also described above, any form of machining or milling known in the art may be used to form the machined insulating element cavity, including, but not limited to nano-manufacturing technology (NMT), laser ablation, and metal etching. Additionally, it is contemplated the machined insulating element cavity may be formed by machining or milling out portions of the metal chassis either from the exterior surface of the metal chassis or from the interior surface of the metal chassis, closest to the interior of the information handling system enclosed by the metal chassis.

As also described above, a portion of the metal chassis may be isolated from the rest of the metal chassis during this step, and the isolated portion may be adapted to form a proximity sensor composed of the same material as the metal chassis. Further, the proximity sensor may take a shape defined by the shape of the machined insulating element cavity. For example, the proximity sensor may include a first and second capacitive strip oriented disparately to one another—one lying flush with the exterior surface of the metal chassis, and the other lying flush with the side exterior wall of the metal chassis. As described above, the proximity sensor in other embodiments may be positioned such that at least one of its capacitive strips lies flush with any exterior side of the metal chassis.

At block 704, in an embodiment, an acid deposition spray may be applied to the walls of the machined insulating element cavity to form a pitted insulating element cavity. As described above, the acid deposition in an embodiment may operate to form deep and non-uniform cavities within the smoothed walls of both the proximity sensor and the metal chassis exposed to the machined insulating element cavity. At block 706, in an embodiment, an insulating element may be injected into the pitted insulating element cavity and allowed to harden. As described above, the hardened insulating element may injected so as to substantially fill the non-uniform cavities formed along the surfaces of both the proximity sensor and the metal chassis by the acid deposition. When hardened, the insulating element in an embodiment may operate to bond or fix the proximity sensor within the metal chassis such that the top exterior surface of the proximity sensor is exposed, but all other edges of the proximity sensor are surrounded by the insulating element. In such a way, the proximity sensor may be formed of the same material as the metal chassis, but may be conductively isolated from the metal chassis. As described above, the insulating element may comprise any insulating element that may be used in an injection molding technique, including, but not limited to resins, such as crystalline polymer polyphenylene sulfide (PPS), and polybutylene terephthalate (PBT), as well as hybrid resins incorporating PPS or PBT with glass fiber.

At block 708, an integrated circuit channel may be milled through a portion of the insulating element located between the integrated circuit and the proximity sensor. As described above, the surface of the proximity sensor lying closest to the interior of the information handling system in an embodiment may be entirely coated by the insulating element. As also described above, the proximity sensor may be operatively connected to an integrated circuit lying within the interior of the information handling system via an electrical conductor such as an electrically conductive wire. As such, an integrated circuit channel may need to be machined through the insulating element lying between the proximity sensor and the interior of the information handling system, making a section of the bottom surface of the proximity sensor accessible from the interior of the information handling system the metal chassis encloses. As also described above, the integrated circuit channel may take any shape that allows for the insertion throughout its length of an electrical conductor such as an electrically conductive wire operatively connected to the proximity sensor on one end, and to an integrated circuit on the other end.

At block 710, in an embodiment, the proximity sensor may be operatively connected to an integrated circuit lying within the interior of the information handling system the metal chassis encloses. As described above, an electrically conductive wire may be passed through the integrated circuit channel, and may be operatively connected to the proximity sensor on one end, and the integrated circuit on the other end. By doing so, the integrated circuit may operate to provide a low-level voltage to the proximity sensor, and to detect a change in capacitance of the proximity sensor when an ionically charged element such as a human body part approaches the vicinity of the proximity sensor.

The blocks of the flow diagrams discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating a proximity based transmitting antenna power management system comprising:
   a processor executing machine readable executable code instructions of the proximity based transmitting antenna power management system;
   an integrated circuit operatively connected to a first embedded proximity sensing strip, a first transmitting antenna, and the processor;
   the first transmitting antenna mounted upon a metal chassis enclosing the processor, and the integrated circuit;
   the first embedded proximity sensing strip having the same material composition as the metal chassis co-located with the first transmitting antenna and lying flush with the external surface of the metal chassis in a corner of the external surface of the metal chassis; and
   an insulating element disposed between the metal chassis and the first embedded proximity sensing strip via injection molding.

2. The information handling system operating a proximity based transmitting antenna power management system of claim 1, wherein the first embedded proximity sensing strip is comprised of a first capacitive strip and a second capacitive strip, one surface of the first capacitive strip lying flush with a top exterior surface of the metal chassis, and one surface of the second capacitive strip lying flush with a side exterior surface of the metal chassis.

3. The information handling system operating a proximity based transmitting antenna power management system of claim 1, further comprising:
   the insulating element being disposed within a pitted insulating element cavity formed by a milling of a machined cavity between the chassis and the first embedded proximity sensing strip, and by application of an acidic deposition spray along the walls of the chassis and first embedded proximity sensing strip exposed to the machined cavity; and
   the first embedded proximity sensing strip being operatively connected to the integrated circuit via an electrical conductor passed through an integrated circuit channel disposed through a portion of the insulating element located between the integrated circuit and the first embedded proximity sensing strip.

4. The information handling system operating a proximity based transmitting antenna power management system of claim 1, wherein the first transmitting antenna comprises a transceiving antenna.

5. The information handling system operating a proximity based transmitting antenna power management system of claim 1, further comprising:
   the processor executing machine readable code instructions of the proximity based transmitting antenna power management system to instruct the integrated circuit to supply a constant voltage to the first embedded proximity sensing strip, to detect a change in capacitance of the first embedded proximity sensing strip, and to instruct the integrated circuit to decrease the voltage supplied to the first transmitting antenna in response to the change in capacitance.

6. The information handling system operating a proximity based transmitting antenna power management system of claim 1, wherein the change in capacitance of the first embedded proximity sensing strip comprises a decrease in capacitance across the first embedded proximity sensing strip.

7. The information handling system operating a proximity based transmitting antenna power management system of claim 1, further comprising:
   the integrated circuit operatively connected to a second embedded proximity sensing strip, and a second transmitting antenna;
   the second transmitting antenna mounted upon the metal chassis; and
   the second embedded proximity sensing strip co-located with the second transmitting antenna.

8. A manufacturing process for fabricating a metallic chassis having an embedded proximity sensing strip comprising:
   milling a first machined cavity within a metallic chassis having a first mounted transmitting antenna to form a first embedded proximity sensing strip lying flush with an exterior surface of the metallic chassis and having the same material composition as the metallic chassis;
   pitting the walls of the metallic chassis and the first embedded proximity sensing strip exposed to the first machined cavity via acidic deposition spray;
   injecting a first insulating element within the pitted walls of the first machined cavity;
   milling a first channel through a portion of the first insulating element located beneath the first embedded proximity sensing strip; and
   operatively connecting a first integrated circuit to the first proximity sensor via a first electrical conductor passed through the first channel.

9. The manufacturing process for fabricating a metallic chassis having an embedded proximity sensing strip of claim 8, wherein the first embedded proximity sensing strip is comprised of a first capacitive strip lying flush with a top exterior surface of the metal chassis, and a second capacitive strip lying flush with a side exterior surface of the metal chassis.

10. The manufacturing process for fabricating a metallic chassis having an embedded proximity sensing strip of claim 8, wherein the first transmitting antenna comprises a transceiving antenna.

11. The manufacturing process for fabricating a metallic chassis having an embedded proximity sensing strip of claim 8, further comprising:

operatively connecting the integrated circuit to a processor executing machine readable code instructions of a proximity based transmitting antenna power management system to instruct the integrated circuit to supply a constant voltage to the first embedded proximity sensing strip, to detect a change in capacitance of the first embedded proximity sensing strip, and, upon detecting the change in capacitance of the first embedded proximity sensing strip, to decrease the voltage supplied to the first mounted transmitting antenna.

12. The manufacturing process for fabricating a metallic chassis having an embedded proximity sensing strip of claim 8, wherein the change in capacitance of the first embedded proximity sensing strip comprises a decrease in capacitance across the first embedded proximity sensing strip.

13. The manufacturing process for fabricating a metallic chassis having an embedded proximity sensing strip of claim 8, wherein the insulating element comprises a thermoplastic material.

14. The manufacturing process for fabricating a metallic chassis having an embedded proximity sensing strip of claim 8, further comprising:
  milling a second machined cavity within the metallic chassis having a second mounted transmitting antenna to form a second embedded proximity sensing strip lying flush with an exterior surface of the metallic chassis and having the same material composition as the metallic chassis;
  pitting the walls of the metallic chassis and the second embedded proximity sensing strip exposed to the second machined cavity via acidic deposition spray;
  injecting a second insulating element within the pitted walls of the second machined cavity;
  milling a second channel through a portion of the second insulating element located beneath the second embedded proximity sensing strip; and
  operatively connecting a second integrated circuit to the second embedded proximity sensing strip via a second electrical conductor passed through the second channel.

15. An information handling system operating a proximity based transmitting antenna power management system comprising:
  a processor executing machine readable executable code instructions of the proximity based transmitting antenna power management system;
  a metal chassis enclosing the processor and the integrated circuit operating as a first transmitting antenna;
  an integrated circuit operatively connected to the metal chassis, a first embedded proximity sensing strip, and the processor;
  the first embedded proximity sensing strip having the same material composition as the metal chassis and lying flush with the external surface of the metal chassis; and
  an insulating element disposed between the metal chassis and the first embedded proximity sensing strip via injection molding.

16. The information handling system operating a proximity based transmitting antenna power management system of claim 15, wherein the first embedded proximity sensing strip is comprised of a first capacitive strip and a second capacitive strip, one surface of the first capacitive strip lying flush with a top exterior surface of the metal chassis, and one surface of the second capacitive strip lying flush with a side exterior surface of the metal chassis.

17. The information handling system operating a proximity based transmitting antenna power management system of claim 15, further comprising:
  the insulating element being disposed within a pitted insulating element cavity formed by a milling of a machined cavity between the chassis and the first embedded proximity sensing strip, and by application of an acidic deposition spray along the walls of the chassis and first embedded proximity sensing strip exposed to the machined cavity; and
  the first embedded proximity sensing strip being operatively connected to the integrated circuit via an electrical conductor passed through an integrated circuit channel disposed through a portion of the insulating element located between the integrated circuit and the first embedded proximity sensing strip.

18. The information handling system operating a proximity based transmitting antenna power management system of claim 15, wherein the first transmitting antenna comprises a transceiving antenna.

19. The information handling system operating a proximity based transmitting antenna power management system of claim 15, further comprising:
  the processor executing machine readable code instructions of the proximity based transmitting antenna power management system to instruct the integrated circuit to supply a constant voltage to the first embedded proximity sensing strip, to detect a change in capacitance of the first embedded proximity sensing strip, and to instruct the integrated circuit to decrease the voltage supplied to the first transmitting antenna.

20. The information handling system operating a proximity based transmitting antenna power management system of claim 15, wherein the change in capacitance of the first embedded proximity sensing strip comprises a decrease in capacitance across the first embedded proximity sensing strip.

* * * * *